INVENTOR.
TSUKUMO NOBUSAWA
NAOYUKI UNO
BY Stanley Wolder
ATTORNEY 3,324,779
PHOTOELECTRIC TIME CONTROL SHUTTER
CIRCUIT FOR PHOTOGRAPHIC CAMERA
Tsukumo Nobusawa, Asaka-machi, Saitama-ken, and Naoyuki Uno, Urawa-shi, Saitama-ken, Japan, assignors to Asahi Kogaku Kogyo Kabushiki Kaisha (English name: Asahi Optical Industry Co., Ltd.), Tokyo-to, Japan, a corporation of Japan
Filed May 26, 1964, Ser. No. 370,199
9 Claims. (Cl. 95—42)

An automatic exposure time control camera generally utilizes a photo-electric time control shutter which automatically controls the exposure time by actuating the shutter by means of accumulated charge of the output current of a photoconductive light receiving element which current is generated, in response to the brightness of the object to be photographed.

In order to make the magnitude of the image angle of the light receiving element to correspond to that of the object to be photographed so that high fidelity correspondence to the photographing light rays can be obtained, various image angle regulating arrangement is made in front of said element. Even by such arrangement, however, it is very difficult to obtain such correspondence of the two image angles, and especially when the image angle varies to a great extent owing to exchange of the objective, the image angle of the said element must be adjusted every time the objective is exchanged so that very troublesome operation is necessary. For such reason, it is most desirable to place the light receiving element in the photographing light path behind the objective or in the light path reflected by a mirror which is obliquely arranged within the photographing light path so that the element is illumined by the same light rays as that impinging on the film. In such a case, when the film is exposed the said element or the mirror must be withdrawn from the light path. The light receiving element at this withdrawn position is no longer illumined. Accordingly, in such automatic exposure time control arrangement, the object brightness sensed by the light receiving element must be memorized by the arrangement at least until the moment of exposure.

The principal object of the present invention is to provide an improved circuit arrangement for performing an accurate shutter operation by sensing the precise object brightness, the operation of the circuit being such that the photoconductive light receiving element placed in the photographing light path causes a capacitor inserted in the timing circuit having said element inserted therein to memorize the object brightness before opening of the shutter, and after withdrawal of said element accompanying shutter opening the time constant control of the timing circuit is performed on the basis of the memorized object brightness.

Another object of the present invention is to provide circuit arrangement which operates in the above mentioned manner and in accordance with actual photographing condition, that is, in response to the film sensitivity value of the photosensitive material used in photography.

Other objects and advantages of the present invention will become apparent upon reading the following detailed description in conjunction with the attached drawings, in which.

Figure 1:
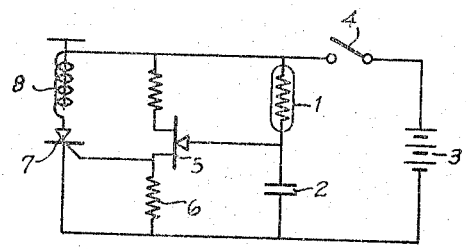
FIG. 1 is a circuit diagram of a photoelectric time control shutter of a generally adopted type.

Referring to FIG. 1, in the generally adopted arrangement the timing circuit comprises a photoconductive light receiving element 1 such as CdS photoconductive element to receive the light rays issuing from the object to be photographed, a capacitor 2 and a battery 3. On opening of the shutter, a switch 4 inserted in said timing circuit is closed and the resistance value of said element 1 determined in response to the received brightness determines a time constant. After the lapse of time set by said time constant, a double base diode 5 develops a pulse voltage across the resistor 6. This pulse voltage makes a silicon control element 7 conductive and operates an electromagnetic device 8 to close the shutter.

Figure 2:
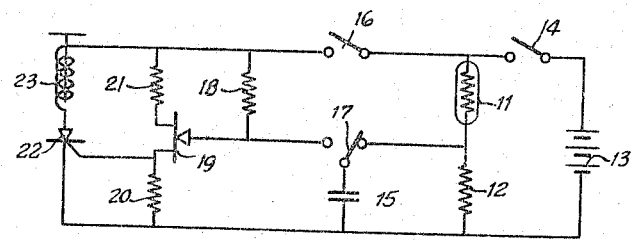
FIG. 2 is a circuit diagram showing the fundamental arrangement of the photoelectric time control shutter circuit embodying the present invention.

Now description of the embodiments of the present invention will be made herebelow:

Referring to FIG. 2, the light amount detecting circuit is constituted by a light measuring photoconductive element 11 which is so arranged in front of the focal plane as to be withdrawable from the light path; a resistor 12, a power source 13 and a switch 14 which are connected in series with said element 11; and a capacitor 15 which can be connected in parallel with said resistor 12 and can be disconnected therefrom as desired. A switch 16 is so arranged as to be closed by coupled movement simultaneously with the withdrawal of the photoconductive light receiving element 11 and opening of the shutter, and another switch 17 is coupled to said switch 16 in such a manner that on closing of same it is changed over from the illustrated position to the opposed contact. Closure of the switch 16 and changeover of the switch 17 complete a timing circuit comprising the switch 17, the capacitor 15, the power source 13, the switch 14, the switch 16 and a resistor 18. To this circuit there is connected an electromagnetic device operating circuit comprising a double-base diode 19, resistors 20 and 21, a silicon control element 22 and an electromagnetic device 23.

On photographing operation first the switch 14 is closed by an actuating movement which is for example coupled to the first stage portion of the shutter release button depressing movement and simultaneously the photoconductive element 11 positioned in the photographing light path receives the light rays issuing from the object to be photographed. At this time the switch 16 is open and the changeover switch 17 is in contact with the contact at the side of the resistor 12. Accordingly through the light amount detecting circuit comprising the power source 13, the photoconductive element 11 and the resistor 12 there flows a current which is regulated by the resistance value of said element 11 determined by the received light illumination. The element 11 and the resistor 12 are connected in series with each other and the power source voltage impressed across them are divided by them. The voltage across the resistor 12 varies with the resistance value of the element 11, and the capacitor 15 is charged in accordance with this voltage value and thus the object brightness is memorized.

Then, simultaneously with for example the second stage portion of the shutter release button depressing movement, the photoconductive element 11 is withdrawn from the light path, the switch 17 is changed over, the switch 16 is closed and the shutter is opened, and thus a circuit comprising the power source 13, the resistor 18 and the capacitor 15 is closed and the capacitor 15 is additionally charged. The time constant is now determined in accordance with the additional charge of the capacitor 15 which was previously memorizingly charged. After the lapse of a time determined by the time constant, the double-base diode 19 is actuated, the capacitor 15 is discharged, and on the other hand, due to actuation of the silicon control element 22 the electromagnetic device 23 is actuated and the shutter is closed. This time interval can be so arranged as to be inversely proportional to the brightness of the light rays received by the photoconductive element. This exposure time control can be performed also in relation to the sensitivity value of the photosensitive material by making the resistor 18 a variable resistor which can be adjusted in accordance with the sensitivity value.

Figure 3:
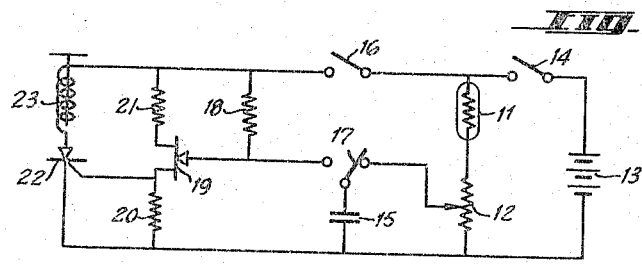
FIGS. 3 and 4 are circuit diagrams respectively showing other embodiments of the present invention.

In the embodiment as shown in FIG. 3 a variable resistor is used for the resistor 12. By properly adjusting this variable resistor 12, exposure setting in accordance with the photosensitive material sensitivity can be performed in a simple manner. The automatic exposure time control is performed by the same circuit operation as that of the arrangement of FIG. 2.

Figure 4:
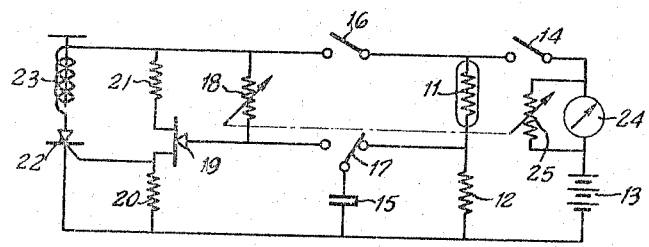

In the embodiment as shown in FIG. 4, an ammeter 24 is inserted in the photoconductive element circuit. The internal resistance value of the ammeter 24 is far smaller than those of the photoconductive element 11 and the resistor 12 so that the circuit operation is not hindered by it. By the indication of this ammeter 24, the operator can know, before shutter operation, whether the object brightness is within the range in which the photoconductive time control of the shutter is possible. Further, making the resistor 18 variable and coupled to another variable resistor 25 inserted in parallel with the ammeter 24, the adjustment of said variable resistor 18 will enable the ammeter 24 to indicate the exposure setting value with consideration to the sensitivity of the photosensitive material.

Figure 5:
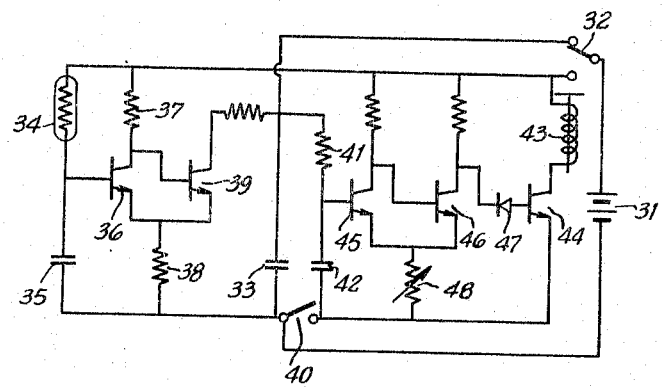
FIGS. 5 to 7 are circuit diagrams respectively showing further improved embodiments of the present invention.
Figure 6:
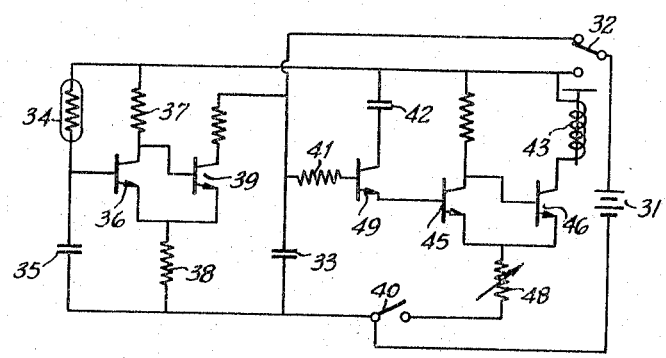
Figure 7:
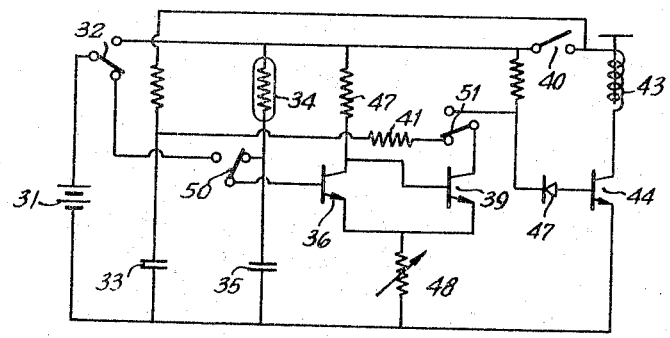

Now, description will be made as to further improved circuit arrangements of the present invention as shown in FIGS. 5–7.

Referring first to FIG. 5, the power source battery 31 is so arranged that a change-over operation of a switch 32 coupled to, for example, the first stage portion of the shutter release button depression movement will connect the battery 31 in series with a charging circuit of a capacitor 33 or with a light amount detecting circuit comprising a light receiving element 34 for light measuring and detecting purpose located within the photographing light path behind the camera objective and a capacitor 35, alternatively.

Between said charging circuit and the light amount detecting circuit there is arranged a discharge amount control circuit of the capacitor 33 comprising a transistor 36 inserted in parallel with said detecting circuit and having its collector and emitter connected via resistors 37 and 38 respectively and its base connected to the lead connecting the light receiving element 34 to the capacitor 35, and another transistor 39 with its base under application of the collector voltage of said transistor 36 and its collector and emitter connected in parallel with the charging circuit capacitor 33 via said resistor 38.

Connected in parallel with this charging circuit capacitor 33 there is provided a circuit comprising in series connection a switch 40 which operates in a movement coupled to shutter opening operation, a resistor 41 and a capacitor 42. Upon closing of the switch 40 this circuit operates as a timing circuit with the charge of said capacitor 33 serving as a power source.

In parallel with said light amount detecting circuit with the battery 31 as a power source there is connected an actuating circuit comprising an electromagnetic relay 43 actuating shutter closing operation and a transistor 44, connected in series with each other, and to this actuating circuit there is connected an additional control circuit for controlling the time for making the transistor 44 conductive and energizing the relay 43. This additional control circuit comprises a transistor 45 operating due to voltage rise at plus terminal of the capacitor 42, another transistor 46 connected to this transistor 45 and a zener diode 47.

In this arrangement, insertion of current amplifying circuit between the timing circuit capacitor 42 and the additional control circuit transistor 45 improved the effect of the operaton. In the emitter circuits of the transistors 45 and 46 there is inserted a variable resistor 48 in series connection so that the resistance value thereof may be adjusted in accordance with the sensitivity value of the photosensitive material.

With the above mentioned structure, the arrangement of this embodiment operates as follows: The change-over switch 32 is normally closed in such a position as to insert the battery 31 in the charging circuit of the capacitor 33, so that the capacitor 33 is normally so charged as to be of equal potential as that of the battery 31. Under this condition, by a movement coupled to the first stage portion of the shutter release button depression movement period to photographing, said switch 32 is so changed over that the battery 31 is inserted in the light value detecting circuit comprising the light receiving element 34 and the capacitor 35. This first stage depression of the shutter release button is an operation of the light-measuring phase and preceding the photographing and some time allowance is necessary before the photographing is carried out. When this change-over of the switch 32 is effected by the release button operation, a charging current flows through the light receiving element 34 located in the photographing light path into the capacitor 35, and the terminal voltage of the capacitor 35 rises with a time constant which is the product of the resistance value of the light receiving element 34 in accordance with the image illumination and the capacity value of the capacitor 35.

On the other hand, change-over of the battery 31 causes the voltage of the battery 31 to be applied via the resistor 37 to the base of the transistor 39 connected in series with the charging circuit capacitor 33, so that the collector-emitter circuit becomes conductive and the capacitor 33 begins to be discharged through said collector-emitter circuit and the resistor 38. This operation continues until the voltage of said light amount detecting circuit capacitor 35 reaches a certain value in accordance with the charging time constant. When the terminal voltage of the capacitor 35 reaches such value as to correspond to the base voltage value of the transistor 36 making it conductive, the transistor 36 becomes conductive, whereupon the base voltage of the transistor 39 in the discharging circuit of the capacitor 33 drops down, making the transistor 39 non-conductive and stopping the discharge of the capacitor 33. This stoppage of discharge leaves a certain amount of charge in the capacitor 33, and the amount of this remaining charge depends upon the time constant value of the light receiving element 34 and the capacitor 35. If the resistance value of the light receiving element 34 is small, that is, if the light receiving face brightness (image illumination) of the element 34 is high, the discharging circuit of the capacitor 33 is opened early so that the discharge amount of the capacitor 33 is small and accordingly the remaining charge is of large amount. On the other hand, if the resistance value of the light receiving element 34 is large, the discharge amount of the capacitor 33 is large and the remaining charge amount is small.

While such operation is made in the light amount detecting circuit, in the additional control circuit having an electromagnetic relay 43 connected in parallel with the battery 31 no such control current as to make the transistor 44, which is electrically connected to said relay 43, conductive, so that said relay 43 is not actuated.

After the discharge of said capacitor 33 is stopped, when the switch 40 is closed by a movement coupled to the second stage portion of the shutter release button depression movement, the capacitor 42 is charged via the resistor 41 with the remaining charge of the capacitor 33. When the charge amount of the capacitor 42 reaches a certain value, owing to the base current due to said charge the transistor 45 becomes conductive and makes the next stage transistor 46 non-conductive. Accordingly, the collector input voltage of the next stage transistor 46 rises. This causes the zener diode 47 to be conductive and accordingly makes the transistor 44 conductive, so that the electromagnetic relay 43 is energized and actuated. The operation of this relay 43 actuates the shutter following screen, etc. and closes the shutter. The time taken by the charge of the capacitor 42 for reaching the amount where it develops a voltage capable of making the transistor 44 conductive depends upon the amount of the remaining charge in the capacitor 33, which charge is the source of charge for charging the capacitor 42. That is, if the remaining charge amount of the capacitor 33 is large the capacitor 42 is charged quickly and the relay 43 operates early, and if the remaining charge amount is small the operation of said relay 43 is delayed.

Accordingly, in this embodiment of the present invention, the object illumination detected by the light receiving element 34 is memorized as the remaining charge of the capacitor 33, and after said light receiving element 34 is withdrawn from the illumination light path, the shutter closing time is automatically controlled by the timing circuit operating with the remaining charge of the capacitor 33 serving as a power source.

In the embodiment as shown in FIG. 6, the capacitor 42 of the timing circuit of the circuit as shown in FIG. 5 is inserted in series connection in the collector input circuit of the current amplifying transistor 49. The preshutter-opening operation producing the remaining charge in the capacitor 33 in accordance with the film image illumination is the same as that of the circuit as shown in FIG. 5. Then, upon closing of the switch 40 in a movement coupled to shutter opening operation, the collector current of the transistor 49, whose base current is due to the remaining charge of the capacitor 33, begins to flow to charge the capacitor 42. As the charging of the capacitor 42 proceeds the charging current diminishes until the intensity of the current reaches a certain fixed value, when the transistor 45, whose base current corresponds to this charging current, becomes nonconductive; and this causes the transistor 46, whose base voltage corresponds to the collector voltage of the transistor 45, to be conductive. As a result, with the supply of power from the battery 31, the relay 43 is actuated to close the shutter.

In view of the fact that in the above embodiments the discharge amount control circuit of the capacitor 33 and the additional control circuit of the electromagnetic relay 43 are of the same arrangement, in the embodiment as shown in FIG. 7, one circuit is made to perform the function of either of the above mentioned two circuits as desired, thereby saving necessary parts of the automatic exposure time control arrangement. In the embodiment of FIG. 7, with the change-over switch 32 in its normally closed position, the battery 31 and the capacitor 33 are connected in series with each other and constitute a preparatory charging circuit (the state as illustrated).

Changing-over of the switch 32 prior to the photographing operation closes a new circuit energized by the battery 31, in which circuit there are arranged, in parallel connection, a light amount detecting circuit comprising a light receiving element 34 and a capacitor 35 connected in series with each other; a control circuit comprising transistors 36 and 39; an actuating circuit comprising a switch 40 to be closed in a movement coupled to shutter opening operation, an electromagnetic relay 43 and transistor 44; and an additional charging circuit of the capacitor 33 having a resistor 41.

Each of change-over switches 50 and 51 is coupled to said change-over switch 32. The switch 50 is so arranged that by its change-over operation the plus terminal voltage of either of the capacitors 33 and 35 is applied to the base of the control circuit transistor 36 alternatively, and the switch 51 is arranged in such a manner that its change-over operation alternatively connects either the capacitor 33 or the battery 31 in series with the collector-emitter circuit of the control circuit transistor 39.

With the change-over switch 32 and the circuit change-over switches 50 and 51 in their respective normally closed positions (as illustrated in FIG. 7), a control circuit comprising transistors 36 and 39 is connected as a circuit corresponding in function to the discharge control circuit of the capacitor 33 in FIG. 5. Remaining charge in accordance with the film image illumination detected by the light receiving element 34 is developed in the capacitor 33. By a movement coupled to shutter opening operation the change-over operation of said circuit change-over switches 50 and 51 is effected and thereby the control circuit comprising transistors 36 and 39 plays the part of the additional control circuit of the arrangement as shown in FIG. 5. In this case, because of closure of the switch 40 a charging circuit of the capacitor 33 is again constituted, and as a result the time necessary for rising of the terminal voltage of the capacitor 33 due to the additional charging operation determines the time of actuating the electromagnetic relay 43.

In each of the above mentioned embodiments, if the light rays impinging on the light receiving element is not under the influence of the diaphragm aperture of the camera lens, then it is desirable that the variable resistor for photosensitivity adjustment be adjusted with regard to the correlation between the photosensitivity value and the set diaphragm value.

As mentioned above, in the arrangement according to the present invention the preparatory charging time is controlled by the light amount impinging on the light receiving element and a change-over operation of the switch effected simultaneously with the shutter opening operation stops the preparatory charging operation. Accordingly, the light receiving element can be so placed in the photographing light path as to be withdrawn from the light path at the moment of exposure so that the exposure light value can be directly detected and accurate exposure time control can be carried out. Further, the desired proper exposure can be performed independent of the diaphragm aperture and with photosensitivity adjustment only, the automatic exposure time control being carried out in accordance with the film photosensitivity value by means of the variable resistor arranged in both preparatory charging and after charging circuits. Further, by means of various additional operation control circuits, the operation can be performed very accurately, and by making part of operation control circuit perform different functions the arrangement can be simplified, thereby reducing the production cost.

It should be understood that the above mentioned are only examples of embodiment of the present invention and other modifications of alterations of design may be made without departing from the spirit of the present invention.

What is claimed is:

1. In an automatic exposure camera including an objective lens shutter means successively movable to open and closed positions defining an exposure sequence and a photosensitive element exposed to the light through said objective lens while said shutter is in the light-measuring phase and unexposed to said light through said objective lens during the open position of said shutter, an information storage device, means for inserting information into said storage device while said shutter is in its pre-exposure position and said photosensitive element is exposed to said light through said objective lens in accordance with the light incident on said photosensitive element, and control means for opening said shutter to initiate an exposure sequence and closing said shutter to terminate said exposure sequence in accordance with the information in said storage device, said photosensitive element being unexposed to said light through said objective lens during said shutter open position.

2. The camera of claim 1 wherein said information storage device comprises a capacitor and said information insertion means comprises means for charging said capacitor to a voltage in accordance with the light incident on said photosensitive element.

3. The camera of claim 1 wherein said information storage device comprises a capacitor and said information inserting means comprises a resistor connected in series with said photosensitive element, a voltage source, means for selectively connecting said voltage source across said resistor and photosensitive element, and means for selectively connecting said capacitor across said resistor, said exposure sequence control means being responsive to the charge on said capacitor.

4. The camera of claim 3 wherein said means for connecting said capacitor across said resistor includes switch means for alternatively connecting said capacitor across said resistor and to said voltage source, and including means for actuating said switch means to connect said capacitor to said voltage source upon the opening of said shutter.

5. The camera of claim 3 wherein said resistor is variable.

6. The camera of claim 3 wherein said means for connecting said capacitor to said voltage source includes a second resistor connected in series with said capacitor.

7. The camera of claim 3 including a current ammeter connected in series with said voltage source and said photosensitive element, a first variable resistor connected across said ammeter, and a second variable resistor simultaneously adjustable with said first variable resistor, said means for connecting said capacitor across said resistor including a switch means for alternatively coupling said capacitor across said resistor and to said voltage source through said second variable resistor.

8. The camera of claim 1 wherein said information storage device comprises a first capacitor and said information insertion means comprises means for charging said first capacitor to a predetermined voltage, a second capacitor, a voltage source, means for connecting said second capacitor, voltage source and photosensitive element to charge said second capacitor in accordance with the light incident on said photosensitive element, and means responsive to the charging of said second capacitor for varying the charge on said first capacitor.

9. The camera of claim 8 including a third capacitor, means responsive to the opening of said shutter for coupling said third capacitor to said first capacitor to vary the charge on said third capacitor in accordance with the charge on said first capacitor, the closing of said shutter being responsive to the charge on said third capacitor.

References Cited
UNITED STATES PATENTS

| | | | |
|---|---|---|---|
| 1,974,433 | 9/1934 | Riszdorfer | 95—10 |
| 2,258,994 | 10/1941 | Merriman | 88—24 |
| 3,020,801 | 2/1962 | Lander | 88—24 |
| 3,200,723 | 8/1965 | Topaz | 95—10 X |

FOREIGN PATENTS

| | | |
|---|---|---|
| 1,974,433 | 9/1934 | Japan. |

JOHN M. HORAN, *Primary Examiner.*